(12) United States Patent
Jahn

(10) Patent No.: US 10,062,336 B2
(45) Date of Patent: Aug. 28, 2018

(54) METHOD AND DEVICE FOR TRANSFERRING AN ELECTRONIC DISPLAY DEVICE INTO A SECURED STATE, AND CONTROLLER FOR CONTROLLING AN ELECTRONIC DISPLAY DEVICE

(71) Applicant: Lemförder Electronic GmbH, Espelkamp (DE)

(72) Inventor: Jorg Jahn, Bünde (DE)

(73) Assignee: LEMFÖRDER ELECTRONIC GMBH, Espelkamp (DE)

( * ) Notice: Subject to any disclaimer, the term of this patent is extended or adjusted under 35 U.S.C. 154(b) by 0 days.

(21) Appl. No.: 15/102,592

(22) PCT Filed: Nov. 17, 2014

(86) PCT No.: PCT/EP2014/074726
§ 371 (c)(1),
(2) Date: Jun. 8, 2016

(87) PCT Pub. No.: WO2015/090779
PCT Pub. Date: Jun. 25, 2015

(65) Prior Publication Data
US 2016/0314748 A1 Oct. 27, 2016

(30) Foreign Application Priority Data
Dec. 17, 2013 (DE) .................. 10 2013 226 167

(51) Int. Cl.
*G06F 3/038* (2013.01)
*G09G 5/00* (2006.01)
(Continued)

(52) U.S. Cl.
CPC ............. *G09G 3/344* (2013.01); *B60K 35/00* (2013.01); *B60K 37/06* (2013.01); *F16H 63/42* (2013.01);
(Continued)

(58) Field of Classification Search
CPC .............................. G09G 2300/0426
See application file for complete search history.

(56) References Cited

U.S. PATENT DOCUMENTS 4,991,096 A 2/1991 Glowczewski et al.
2006/0124897 A1* 6/2006 Shingai ............ G02F 1/133377
252/299.01
(Continued)

FOREIGN PATENT DOCUMENTS

DE 10 2008 023231 A1 11/2009
EP 1502802 A1 2/2005

OTHER PUBLICATIONS

International Search Report and Written Opinion dated Mar. 3, 2015 for PCT/EP2014/074726 (German language, 8 pages).
(Continued)

*Primary Examiner* — Nan-Ying Yang
(74) *Attorney, Agent, or Firm* — Brinks Gilson & Lione

(57) ABSTRACT

A method for setting an electronic display device for a vehicle to a secure state, wherein the electronic display device is designed to display, in response to an image signal received by a control mechanism, an image datum transmitted by the image signal, and to maintain the display without applying an operating voltage, is characterized in that the method comprises a step for receiving a diagnosis signal via an interface to the control mechanism, wherein the diagnosis signal represents a signal provided by the control mechanism, and furthermore, a step for outputting a reset signal to an interface to the display device, depending on a signal status of the diagnosis signal, wherein the reset signal is designed to trigger a display of a secure image datum by the display device, in order to set the display device to the secure state.

17 Claims, 3 Drawing Sheets

(51) Int. Cl.
*G09G 3/36* (2006.01)
*G09G 3/34* (2006.01)
*B60K 37/06* (2006.01)
*F16H 63/42* (2006.01)
*B60K 35/00* (2006.01)

(52) U.S. Cl.
CPC ... *G09G 2330/021* (2013.01); *G09G 2380/10* (2013.01)

(56) References Cited

U.S. PATENT DOCUMENTS

2008/0201215 A1* 8/2008 Lin ............... G06Q 30/02
 705/14.62
2011/0175861 A1* 7/2011 Wakimoto ........ G09G 3/3648
 345/204

OTHER PUBLICATIONS

International Search Report dated Mar. 3, 2015 for PCT/EP2014/074726 (English language, 2 pages).

* cited by examiner

METHOD AND DEVICE FOR TRANSFERRING AN ELECTRONIC DISPLAY DEVICE INTO A SECURED STATE, AND CONTROLLER FOR CONTROLLING AN ELECTRONIC DISPLAY DEVICE

RELATED APPLICATIONS

This application is a filing under 35 U.S.C. § 371 of International Patent Application PCT/EP2014/074726, filed on Nov. 17, 2014, and claims the priority of German Patent Application DE 10 2013 226 167.5, filed Dec. 17, 2013, both of which are incorporated by reference herein in their entirety.

BACKGROUND

1. Technical Field

The present invention relates to a method and a device for setting an electronic display device for a vehicle to a secure state, and to a control device for controlling electronic display devices, wherein the display device is designed to maintain the display without applying an operating voltage.

2. Background Information

EP 1 502 802 A1 discloses a gearshift knob of a gearshift lever in a motor vehicle, wherein an optical data carrier is provided in the head region of the gearshift knob, that is visible, in the operating installation position, to the driver of the motor vehicle.

BRIEF SUMMARY

Based on this, the present invention creates an improved method and an improved device for setting an electronic display device for a vehicle to a secure state, as well as an improved control device for controlling an electronic display device in accordance with the independent Claims. Advantageous designs can be derived from the dependent Claims and the following description.

A display device with which energy is needed only to change a displayed image datum, but which requires no energy for a continuous display of the image datum, is particularly suited for use in the automotive field. A display device of this type is known under the term electronic paper. By way of example, a display of this type may be based on the principle of electrophoresis. The image datum can be depicted thereby through colored particles, which are brought into a position when an electrical field is applied, in which they are visible or invisible to an observer. When using such a display device, which is also referred to as a static display, the light used for depicting an image datum is not emitted, but rather, reflected. As a result, current for operating the display device is then only needed when the contents of the display are to be changed. A display surface of the display device may be curved within limits, and it can be read from a large range of perspectives.

The display device may be used in the automotive field, for example, with automatic gearshift levers or push-button shifts, instead of, or in combination with light emitting displays or LEDs, which must be permanently electrically activated for the gear information or other data, e.g. a logo, the time of day, error messages, or a driving mode, to be displayed on the knob or at other locations of an operating device. Thus, there is the exemplary use of the display device in a gearshift knob of a vehicle, which has such a display device at a position that is visible for the driver of a vehicle. Advantageously, no permanent electrical activation is necessary for operating the display device.

In contrast to light emitting display elements, e.g. based on displays and/or LEDs, the display device can be read easily, even in strong sunlight. For this reason, it is not necessary to generate high levels of brightness, which in conventional displays discharge an enormous power loss in the form of heat, by means of which the power consumption is increased in an undesirable manner, and results in a noticeable heating of the operating device. As a result of the low energy requirements of the display device, needed only for changing a displayed image datum, user discomfort when touching the gearshift lever, caused by heat discharge, can be avoided. Due to the negligible heat discharge, no higher demands need to be placed on the electronic components, and the probability of a malfunction is low. Furthermore, there are no limitations in terms of the viewing perspective. Another advantage is that the display device is also suitable for use on curved surfaces, i.e. it can be curved.

In order to ensure that the image datum depicted by the display device does not permanently remain frozen, e.g. after a control mechanism for activating the display device malfunctions, the image datum depicted by the display device can then be overwritten, or cleared, for example, if the control mechanism is in an unsecure operating state, e.g. when a re-starting of the control mechanism is necessary, or is executed, or the control mechanism is shut off. By replacing a currently displayed image datum displayed by the display device with a secure image datum, which appears to a viewer of the display device as a single color display, the display device can be set to a secure state.

A method for setting an electronic display device for a vehicle to a secure state, wherein the electronic display device is designed to display, in response to an image signal received by a control mechanism, an image datum transmitted by the image signal, and to maintain this display without an operating voltage being applied, comprises the following steps: receiving of a diagnosis signal via an interface to the control mechanism, wherein the diagnosis signal represents a signal provided by the control mechanism; and outputting a reset signal to an interface to the display device, as a function of a signal status of the diagnosis signal, wherein the reset signal is designed to trigger a display of a secure image datum by the display device, in order to set the display device to a secure state.

The image signal and the reset signal may represent electric signals, which are emitted, for example, via output drives for electrical circuits, and are transmitted, for example, via electrical lines, e.g. conductor paths of a printed circuit board. The image signal and the reset signal may be provided to the display device via two separate transmission paths. The display device can be designed to adjust image points of a display surface of the display device, in response to reception of the image signal or the reset signal, such that the image datum transmitted by the respective signal is graphically depicted. Different image data can be transmitted to the display device via the image signal. An image datum can, for example, depict a symbol, a pictogram, one or more letters, or even a single-color field. The secure image datum can, for example, depict a consistent single-color field.

According to one embodiment, the reset signal can be emitted in the step for outputting a signal, when the diagnosis signal exhibits an inactive signal status. Accordingly, the reset signal may not be emitted in the step for outputting a signal when the diagnosis signal exhibits an active signal status. An active signal status can be characterized by an active driving of a signal level of the diagnosis signal, in particular by maintaining the signal level at a signal voltage differing from that of the ground. By way of example, the active signal status can be characterized by a voltage value that exceeds the level of a predetermined voltage threshold. The inactive signal status can be characterized, accordingly, by a voltage value that falls below the level predetermined voltage threshold. The active signal status can be referred to, for example, as high-level, and the inactive signal status can be referred to as low-level of the diagnosis signal. The low level can be the ground. Advantageously, in this manner, the reset signal can then be emitted when the control mechanism is not capable of driving the diagnosis signal in the active state, i.e. to maintain the active signal status.

The method can comprise a step for controlling the energy flow of an energy necessary for outputting the reset signal, using the diagnosis signal. In the output step, the reset signal can be emitted using the energy. By controlling the energy flow, the energy flow may be blocked or released. By blocking the energy flow, the emission of the reset signal can be reliably prevented, because the energy necessary for outputting the reset signal is not available. The releasing of the energy flow can result in an automatic generation and output of the reset signal. As a result, the output of the reset signal can be easily controlled by controlling the energy flow. The energy can represent an electrical energy. The energy flow can be an electrical current flowing through an electrical line. Thus, the controlling of the energy flow can be easily implemented using a switching mechanism, which disconnects or connects the line for conducting the energy flow.

The method may comprise a step thereby for accumulating an energy reserve in order to provide the energy flow. In order to accumulate the energy reserve, an energy storage unit may be charged. A known energy storage unit, e.g. in the form of a capacitor or rechargeable battery may be used thereby. If a rechargeable battery is used as the energy storage unit, the rechargeable battery is preferably coupled to a monitoring device, which monitors the current level and/or the voltage supplied to the rechargeable battery in order to charge the rechargeable battery. The monitoring device can be a part of the control mechanism.

A corresponding device for setting an electronic display device for a vehicle to a secure state, wherein the electronic display device is designed to display, in response to an image signal received from a control mechanism, an image datum transmitted by the image signal, and to maintain this image datum without applying an operating voltage, has the following features: a receiving mechanism, for receiving a diagnosis signal via an interface to the control mechanism, wherein the diagnosis signal represents a signal provided by the control mechanism; and an output mechanism for outputting a reset signal to an interface to the display device as a function of a signal status of the diagnosis signal, wherein the reset signal is designed to trigger the display of a secure image datum by the display device, in order to set the display device to a secure state.

The mechanisms of the device can be designed to implement the steps of the method for setting an electronic display device to a secure state. The interfaces may be implemented, for example, as electrical connections. The mechanisms can be designed as electrical circuits.

By way of example, the device may have a switching mechanism and a provision mechanism for providing the reset signal to the output mechanism. The switching mechanism can be designed thereby to control a connection, controlled by the diagnosis signal, between the provision mechanism and an interface to an energy reserve for providing an energy source necessary for operating the provision mechanism. The provision mechanism can, for example, be an integrated circuit and the output mechanism can be an output drive of the provision mechanism. By way of example, a first signal status of the diagnosis signal, e.g. an active signal status, may result in a disengaging of the switching mechanism, and a second signal status of the diagnosis signal, e.g. an inactive signal status, may result in an engaging of the switching mechanism. In this manner, the switching mechanism can be actuated directly by the diagnosis signal, without further logics components. A switching mechanism of this type can, for example, be inexpensively implemented by means of a transistor circuit. Depending on the switching state of the switching mechanism, the energy required for operating the provision mechanism may or may not be provided by the energy reserve to the provision mechanism via the switching mechanism. As a result, the operation of the provision mechanism can be very easily controlled.

According to one embodiment, the device may include the energy reserve in the form of a capacitor. Advantageously, a capacitor of this type may store sufficient energy for outputting the reset signal, and enable a display of the secure image datum by the display device.

The output device can therefore be designed to output a portion of the energy in the energy reserve to an operating voltage interface for providing the operating voltage to the display device. The portion of the energy can be conducted thereby via the switching device. Thus, the energy in the energy reserve can then be used for operating the display device when the control mechanism is in a non-secure operating mode, or in the switched-off state. In this manner, it can be ensured that the display device is supplied with sufficient energy for depicting the secure image datum, even when an energy source for supplying the display device malfunctions during the secure operating mode of the control mechanism.

The specified device for setting the display device to a secure state, in conjunction with the specified control mechanism for controlling the display device, can be referred to as a control device.

A control device of this type, for controlling an electronic display device for a vehicle, wherein the electronic display device is designed to display, in response to an image signal received from a control mechanism, an image datum transmitted by the image signal, and to maintain this display without applying an operating voltage, has the following features: the control mechanism, having a first output interface for providing the image signal, and a second output interface for outputting a diagnosis signal, wherein the control mechanism is designed to trigger an active signal status of the diagnosis signal when the control mechanism is in a secure operating mode, and to cause, or maintain an inactive signal status of the diagnosis signal when the control mechanism is in a non-secure operating mode, or an inactive mode; and a specified device for setting the electronic display device to a secure state, wherein the setting device is designed to output the reset signal when the diagnosis signal exhibits the inactive signal state, and to not output the reset signal when the diagnosis signal exhibits the active signal state.

The control mechanism can be designed as an integrated circuit, e.g. in the form of a microcontroller. The device for setting the display device to a secure state, or mechanisms of the device for setting the display device to a secure state, can be implemented and disposed separately from the control mechanism, e.g. in separate housings. In this manner, it can be prevented that an error pertaining to the control mechanism has an effect on the setting device. The setting device for setting the display device to a secure state can have an independent energy supply, provided, for example, by an energy reserve, which enables operation of the device even after the energy supply for the control mechanism fails. Advantageously, the device can be operated independently of the control mechanism, such that the reset signal can still be output by the device for setting the display device to a secure state, even after a complete malfunction of the control mechanism.

According to one embodiment, the control mechanism can have an input interface for receiving data regarding a gear setting of a transmission of the vehicle that has been or is to be shifted to, and designed to output the image signal with an image datum that represents the gear setting. An embodiment of this type is practical in conjunction with the use of a gear setting display implemented by the display device. Advantageously, it is then possible to display a current gear setting of a transmission of the vehicle to a driver of a vehicle thereby. Using the device for setting the display device to a secure state, it is possible to ensure that the display device does not permanently display a gear setting after the control mechanism malfunctions, for example, which in some situations, due to a gear shifting that has been executed, is no longer the current gear setting.

Alternatively, or additionally, the control device can have an input interface for receiving data regarding a gear setting of a transmission of the vehicle that is to be shifted to, and can be designed to output the image signal with an image datum displaying a directional indicator for shifting to the gear setting that is to be shifted to. The directional indicator can comprise, e.g. two individual, displayable, direction arrows pointed in opposite directions, wherein, for example, an arrow pointing upward can be displayed in order to indicate an upward shifting, and an arrow pointing downward can be displayed in order to indicate a downward shifting, in order to obtain the gear setting that is to be shifted to.

Furthermore, alternatively or additionally, the control mechanism can have an input interface for receiving a datum regarding an error in the control device, and can be designed to output the image signal with an image datum indicating the error. In this manner, a possible error of the control device can be displayed in a simple manner, and can thus be read out.

The input interface can be configured to receive a datum, or at least two different data. In this manner, by designing the control mechanism to receive different data, it can be provided in the appropriate manner for receiving any datum of an input interface, or for receiving different data from a collective input interface.

A device can be understood to be an electrical device, which processes electrical signals, and outputs control signals as a function thereof. The device can have one or more suitable interfaces, which may be designed in terms of hardware and/or software. With a hardware-type design, the interfaces can be a part of an integrated circuit, for example, in which functions of the device are implemented. The interfaces can be individual integrated circuits, or can at least be composed of discrete components. With a software-type design, the interfaces can be software modules, which are present, for example, on a microcontroller in addition to other software modules.

A computer program product having programming code is also advantageous, which can be stored on a machine-readable medium, such as a semiconductor memory, a hard disk memory, or an optical memory, and can be used for executing the method according to one of the embodiments described above, when the program is executed on a computer or a device.

BRIEF DESCRIPTION OF THE DRAWINGS

The invention shall be explained in greater detail based on the attached drawings. Therein.

DETAILED DESCRIPTION OF THE DRAWINGS AND THE PRESENTLY PREFERRED EMBODIMENTS

In the following description of preferred exemplary embodiments of the present invention, the same or similar reference symbols shall be used for the elements depicted in the figures and having similar functions, wherein there shall be no repetition of the description of these elements.

Figure 1:
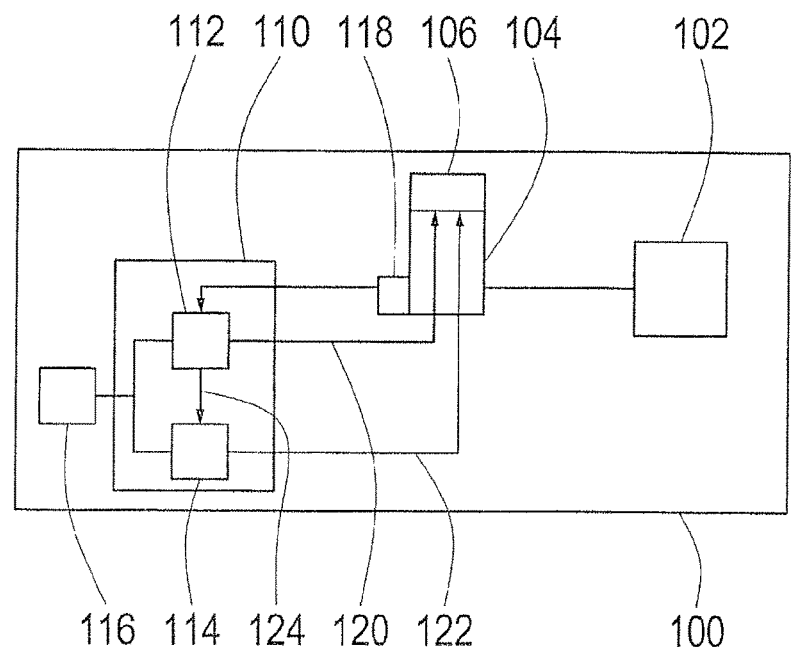
FIG. 1 shows a vehicle with a display device according to one exemplary embodiment of the present invention.

FIG. 1 shows a vehicle 100 having a transmission 102, a gearshift lever 104 for operating the transmission 102, and an electronic display device 106 in accordance with an exemplary embodiment of the present invention. By way of example, the display device 106 is disposed on the gearshift lever 104. The display device 106 is used in the installed state to display a gear setting of the transmission 102, selected via the gearshift lever 104, for example, to a driver of the vehicle 100.

The display device 106 is designed to display an image datum, in response to the reception of an image signal, e.g. a letter or a symbol. The display device 106 is based, for example, on the principle of electronic paper, and requires electrical energy in order to acquire image data, but requires no additional energy in order to maintain the image data that has already been acquire.

A control device 110 is provided for activating the display device 106. The control device 110 comprises a control mechanism 112 and a device 114 for setting the display device 106 to a secure state. The control device 110 is supplied with electrical energy, according to this exemplary embodiment, by activating the ignition of the vehicle 100, for example, by a battery 116 in the vehicle 100. The display device 106, the control device 110, and the device 114 can be referred to collectively as a display unit.

The control mechanism 112 is designed to provide an image signal 120 to the display device 106 or a control logic of the display device 106, in order to change an image datum of an image signal 120 displayed by the display device 106. By way of example, the control mechanism 112 can be designed to receive an actuation signal indicating an actuation of the gearshift lever 104 from a sensor 118 coupled to the gearshift lever 04. The control mechanism 112 may be designed to select an image datum assigned to the actuation in response to receiving the actuation signal, and to output an image signal 112, comprising the image datum, to the display device 106. Furthermore, the control mechanism 112 can be designed to provide the electrical energy required for changing the image datum to the display device 106. Furthermore, or alternatively, the control device 112 can be coupled to the transmission 102, and can be designed to receive a gear selection signal indicating the gear setting shifted to by the transmission 102. The control mechanism 112 can be designed to select an image datum assigned to the gear setting that has been shifted to in response to a reception of the gear selection signal, and to output an image signal 120 comprising the image datum to the display device 106. Furthermore, the control device 112 can be designed to carry out a comparison of the data regarding the actuation of the gearshift lever 104 with the information regarding the gear setting that has been shifted to in the transmission 102, and to select the data regarding a corresponding image signal 120, comprising data as image data, that is to be output to the display device 106, in order to subsequently output the image signal 120 containing the image datum to the display device 106. By way of example, the control mechanism 112 can be designed to select an image datum assigned to the gear that has been shifted to as an image signal 120, and to output it to the display device 106, when the datum regarding the gear that has been shifted to is different from the datum regarding a gear selection assigned to the actuation of the gearshift lever. In this context, the control mechanism 112 can furthermore be designed to select an image datum assigned to the error indicating the difference, and to output this as an image signal to the display device 106.

As long as the control mechanism 112 is in a secure operating mode, in which it can be assumed that the control mechanism 112 functions correctly, the image datum displayed by the display device 106 can always correspond to an actuation or setting of the gearshift lever 104, or to a selected gear setting of the transmission 102 or a current driving setting of the vehicle 100.

When the control mechanism 112 is in a non-secure operating mode, however, due to an error occurring and detected in the control device 112 for example, or is in a deactivated state, due to an interrupted energy supply line for example, it may not be possible to ensure that the image datum displayed by the display device 106 is still current, thus corresponding to an actuation state of the gearshift lever 104, for example. In order to prevent an undesired or erroneous display by the display device 106 in such a case, the device 114 is designed to set the display device 106 to a secure state. In the secure state, the display device 106 displays a secure image datum, e.g. in the form of a single-color field, or a warning signal. In order to set the display device 106 to the secure state, the device 114 is designed to output a reset signal 122 to the display device 106 resulting in a display of the secure image datum. The device 114 is designed to output the reset signal 122 as a function of a signal status of a diagnosis signal 124 provided by the control device 112.

The control mechanism 112 is designed to provide the diagnosis signal 124 with an active signal status when the control mechanism 112 is in the secure operating mode. When the control mechanism 112 is in a switched-off state or in a non-secure operating mode, the control mechanism 112 is designed to provide the diagnosis signal 124 with an inactive signal status, thus to drive the diagnosis signal 124 into an inactive signal status. Accordingly, the device 124 is designed to output the reset signal 122 to the display device 106 when the diagnosis signal 124 exhibits an inactive signal status, and to not output the reset signal when the diagnosis signal 124 exhibits an active signal status. By way of example, the device can have a switching device, the switching state of which is controlled by the diagnosis signal 124. The reset signal 122 can be output or not output, depending on the switching status of the switching device.

In order to output the reset signal 122, the device 114 can have an energy reserve, which can be recharged, for example, by the battery 116. An energy reserve of this type enables the device 114 to provide the reset signal 112, even when the battery 116 fails.

Mechanisms of the control mechanism 112 and the device 114 can be disposed on a shared printed circuit board, for example. The control mechanism 112 and the device 114 or mechanisms of the control mechanism 112 and mechanisms of the device 114 can each be disposed in separate housings thereby. The control device 110 can be separate from the gearshift lever 104, or, alternatively, disposed on or in the gearshift lever 104.

Figure 2:
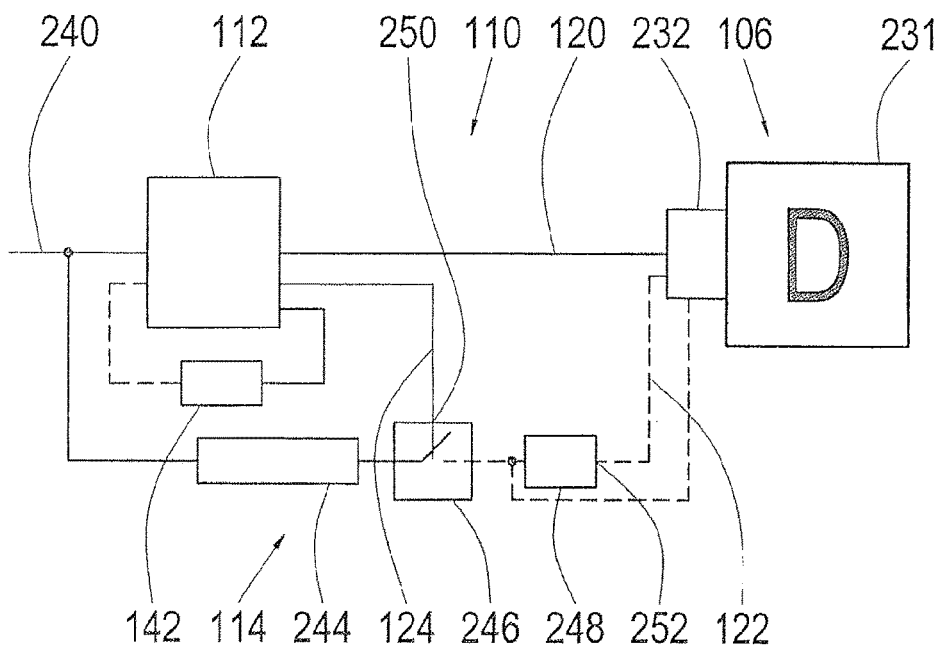
FIGS. 2 to 4 show different operating states of a display unit according to an exemplary embodiment of the present invention.

FIG. 2 shows a block diagram of a display unit with a display device 106 and a control device 110 for activating the display device 106 according to one exemplary embodiment of the present invention. As has already been explained with reference to FIG. 1, the control device 110 comprises a control mechanism 112 and a device 114 for setting the display device 106 to a secure state.

According to this exemplary embodiment, the display device 106 has a display screen 231 for depicting the image datum, in this case the letter "D", by way of example, and a logic mechanism 232, in this case an active-matrix logic unit for controlling the graphical depiction of the image datum by the display screen 231. The logic mechanism 232 has input ports for receiving image signals 120 provided by the control mechanism 112 and to receive a reset signal 122 provided by the device 114. For this, the logic mechanism 232 is connected to the control mechanism 112 via a line for conducting the image signal 120, and to the device 114 via a line for conducting the reset signal 122. The input port for receiving the image signal 120 can be designed as a COM port.

The control mechanism 112 is designed as a microcontroller according to this exemplary embodiment. The control mechanism 112 has an input port for receiving an operating voltage 240 from an ignition. The operating voltage 240 can be provided to a vehicle, for example, from an ignition mechanism "KL 15." When the operating voltage 240 is present, the control mechanism 112 can be in operation. When there is no operating voltage 240, the control mechanism 112 can be out of operation. According to the exemplary embodiment shown in FIG. 2, the operating voltage 240 is present, and therefor exhibits the status "ON," for example.

At the output end, the control mechanism 112 has an output port for outputting the image signal 120 and an output port for outputting the reset signal 124. The control mechanism 112, thereby, is connected to the device 114 via a line for conducting the reset signal 124. The output ports may have suitable drives for outputting the signals 120, 124. The last image signal 120 output by the control mechanism 112 has the image datum to be displayed, comprising the "D" currently displayed by the display device 106. The "D" appears as a white letter against a black background to the observer.

The control mechanism 112 is in a secure state. For this reason, the reset signal 124 has an inactive status, e.g. "disabled." By way of example, the reset signal 124 is driven to the inactive status by the control mechanism 112 for this.

According to this exemplary embodiment, a monitoring mechanism 142 in the form of a "watchdog" is provided. The monitoring mechanism 142 is connected to the control mechanism 112 via two lines. According to this exemplary embodiment, the monitoring mechanism 142 is designed to control a resetting, a so-called "reset," of the control mechanism 112. According to the exemplary embodiment shown in FIG. 2, no reset is being carried out at the moment.

The monitoring mechanism 142 or another monitoring mechanism, which can also be integrated in the control mechanism 112, can be designed to detect a secure state or a non-secure state of the control mechanism 112, and to display this, for example, in order to control the active driving of the active signal status of the diagnosis signal.

According to this exemplary embodiment, the device 114 comprises an energy reserve 224 in the form of a voltage buffer, a switch 246 and an integrated circuit 248. The switch 246 and the integrated circuit 248 can each be designed as discrete components. An input of the energy reserve 244 is connected to the operating voltage 240. An output of the energy reserve 244 is connected to an input 250 of the switch 246. An output of the switch 246 is connected to an input of the integrated circuit 248, and an input of the logic unit 232 of the display device 106. An output 252 of the integrated circuit 248 is connected to another input of the logic mechanism 232. The switch 246 has a control input for receiving the diagnosis signal 124.

Due to the active status of the diagnosis signal 124, the switch 246 is in the disconnected state. Thus the output of the energy reserve 244 is disconnected from the input of the integrated circuit 248 and the input of the logic mechanism 232. No current flows through the switch 246. This, the integrated circuit 248 is deactivated, and the reset signal 122 is not output to the logic mechanism 232.

According to one exemplary embodiment, the operating voltage 240 is provided from a "KL 15" ignition. The monitoring mechanism 142 is designed as a "watchdog," and the integrated circuit 248 is designed as an IC, in particular as an integrated circuit for clearing the display of the display device 246, corresponding to individual options of the respective display device 106 being used. The logic mechanism 232 is designed as an active matrix logic unit, in particular as an addressing logic unit and an activation logic unit, for the individual activation of each image point, or pixel, individually on the display screen 231. The line, or the lines, for the image signal 120 is designed as a COM communication interface, e.g. as an SPI (Serial Peripheral Interface). The energy reserve 244 is designed as a supply buffer for maintaining the supply voltage of the self-sufficient branches 246, 248 after switching off the operating voltage 240. By way of example, the energy reserve 244 is designed as a self-sufficient capacitor. The switch 246 is constructed as a transistor switch, e.g. comprising two transistors, in order to form the open function when the diagnosis signal is in the active "enabled" state, and the closed function when the diagnosis signal is in the inactive "disabled" state.

According to this exemplary embodiment, the ignition is on, the control mechanism 112 is deactivated by means of the switch 246 of the integrated circuit 248, and communicates with the display 106, which then outputs the current driving stage "D."

Figure 3:
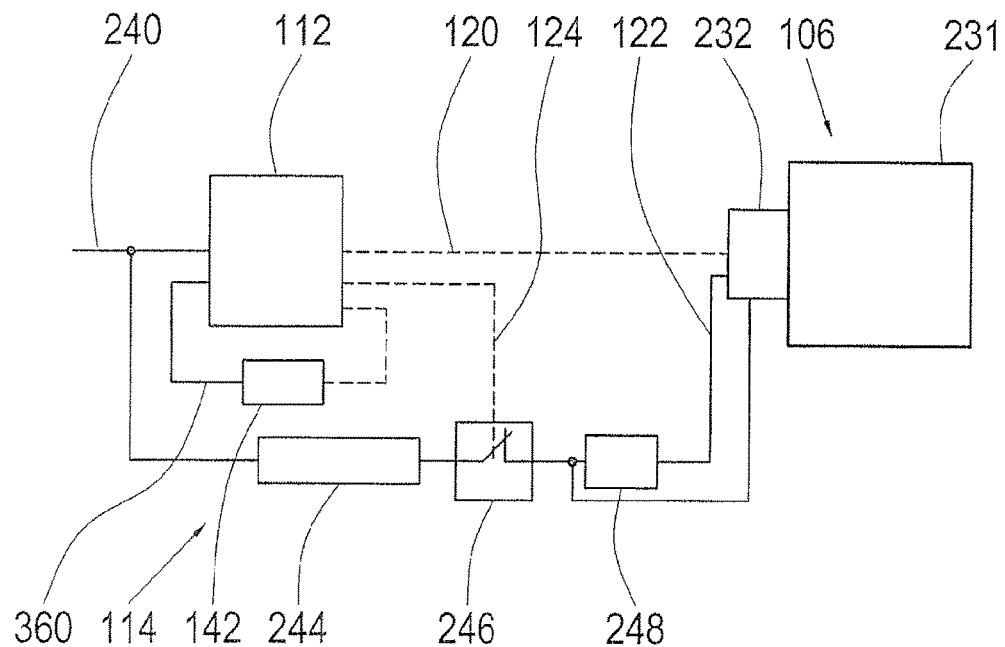

FIG. 3 shows a block diagram of the display device 106 described in reference to FIG. 2, and the control device 110 described in reference to FIG. 2, in accordance with an exemplary embodiment of the present invention.

According to this exemplary embodiment, the ignition is on, a reset of the control mechanism 112 occurs due to an internal error in the control mechanism 112, the switch activates the integrated circuit 248, and the display screen 231 is actively cleared by the integrated circuit 248.

According to this exemplary embodiment, the control mechanism 112 is in a non-secure state. A reset of the control mechanism 112 is executed thereby, in accordance with this exemplary embodiment. For this, a reset signal 360 is output to the control mechanism 112 by the monitoring mechanism 142.

The operating voltage 240 is present. The image signal 120 is not output. The diagnosis signal 125 exhibits an inactive signal status, e.g. "disabled." Due to the inactive status of the diagnosis signal 124, the switch 246 is in a switched-on state. Thus, the output of the energy reserve 244 is connected in an electrically conductive manner to the input of the integrated circuit 248 and the input of the logic mechanism 232 via the switch 246. A current provided by the energy reserve 244 flows through the switch 246. A voltage of the energy reserve 244 provided via the switch 246 is used as the operating voltage for the integrated circuit 248 and as the operating voltage for the logic mechanism 232. The integrated circuit 248 is activated, and designed to output the reset signal 122 to the logic mechanism 232. In response to reception of the reset signal 122, the logic mechanism 232 is designed to depict a graphical depiction of a secure image datum, here a single-color black or dark surface area, by means of the display screen 231. The secure image datum can be transmitted to the logic mechanism 232 via the reset signal 122. Alternatively, the logic mechanism 232 can be designed to generate the secure image datum in response to the reset signal. By using the electrical energy provided by the energy reserve 244 via the switch 246, a current graphical depiction of an image datum can be overwritten, e.g. the "D" shown in FIG. 2, by a graphical depiction of the secure image datum, in this case a black field. The graphical depiction of the secure image datum is maintained by the display device 106, even after the energy reserve 244 is empty.

Figure 4:
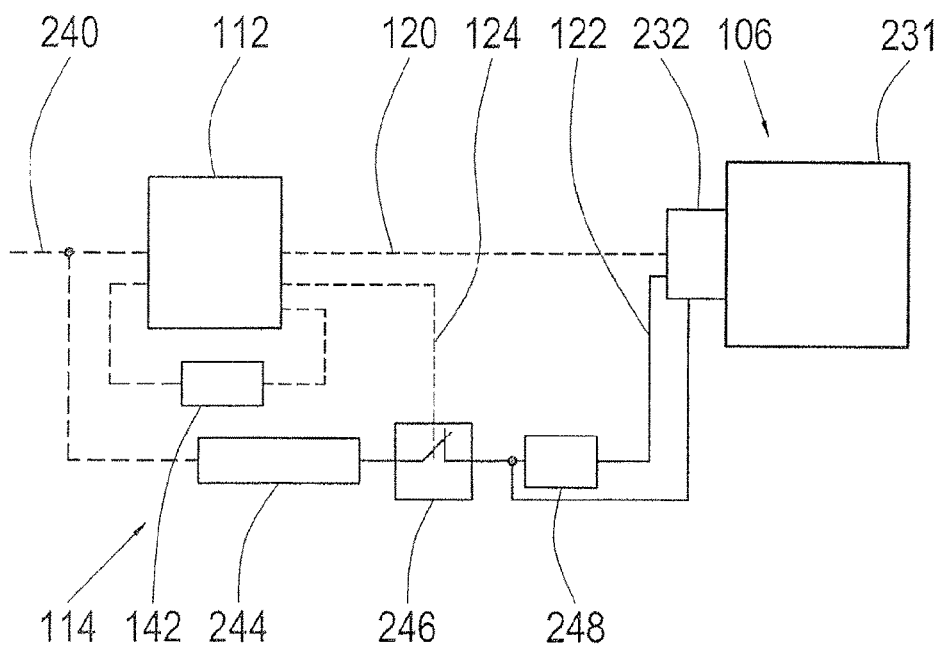

FIG. 4 shows a block diagram of the display device 106 described in reference to FIG. 2, and the control device 110 described in reference to FIG. 2, in accordance with an exemplary embodiment of the present invention.

According to this exemplary embodiment, the ignition is off, the control mechanism 112 is inactive, the switch 246 activates the integrated circuit 248, and the display screen 231 is actively cleared by the integrated circuit 248.

According to this exemplary embodiment, the control mechanism 112 is in a switched-off state, because the operating voltage 240 is not present. The image signal 120 is not output. The diagnosis signal 124 exhibits an inactive state, e.g. "disabled." Due to the inactive state of the diagnosis signal 124, the switch is in the "on" state. Thus, the output of the energy reserve 244 is connected in an electrically conductive manner to the input of the integrated circuit 248 and the input of the logic mechanism 232. This results in, as described in reference to FIG. 3, a current graphical depiction of an image datum, e.g. the "D" shown in FIG. 2, being overwritten by a graphical depiction of the secure image datum, in this case a black field. The graphical depiction of the secure image datum is maintained by the display device 106, even after the energy reserve 244 is empty.

Different exemplary embodiments of the present invention shall be described in greater detail below, with reference to FIGS. 2 to 4.

The display device 106 may be designed as a black and white screen or as a screen that can depict symbols in color. The display device 106 can be designed as a semi-transparent display, which can be backlit, in order to implement visibility lighting at night. Instead of a backlighting, incident light can also be used, e.g. from an ambient lighting of the vehicle, or via a frontal illumination in the form of waveguide structures (e.g. nano-print technology) directed toward the display surface.

Furthermore, the display can preferably also be designed as a touch-sensitive surface, also known as a "touchscreen." By way of example, the touch-sensitive surface can be a capacitive surface. In this manner, the display can also be used as a human-machine interface.

According to one exemplary embodiment, a gear-setting datum is depicted by the display screen 231. The gear-setting datum is normally classified as being relevant to safety in a vehicle. For this reason, the display screen 231 in the gearshift lever can not only be switched off, when, for example, the control mechanism 112 detects an error via an internal safety diagnosis, or the watchdog forces the control mechanism 112 into a reset, in order to end up in the secure state, but rather, it is actively, thus with current, deactivated, or, respectively, the gear-setting datum is overwritten with a clearing function, e.g. the screen becomes entirely black or entirely white. For this, a safety mechanism is used, which also functions self-sufficiently. If the display screen 231 can no longer be altered, e.g. due to a short circuit on a signal printed circuit board, on which the control mechanism 112 is disposed, a self-sufficient capacitor 244 assumes the supplying of energy to all circuitry components 248, 232 that are necessary for a resetting of the display screen 231 into the secure state, at least for a safety period (error tolerance period). The same mechanism can be designed such that in general, when the voltage supply 240 is deactivated, e.g. after the ignition is switched off, the display 231 becomes entirely black.

The described approach can be used, for example, in a vehicle in the form of passenger car, in the engineering field of a drive train, e.g. an agricultural vehicle, in the engineering field of switching systems, and in particular in the technology of a circuit element.

The approach is not limited thereby to the specified applications. Instead, the described approach can be applied to other related types of operating elements in a vehicle, e.g. a driving mode (rotational) switch, or in other devices not in the automotive field.

Figure 5:
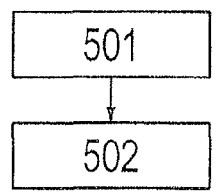
FIG. 5 shows a flow chart for a method for setting an electronic display device for a vehicle to a secure state.

FIG. 5 shows a flow chart of a method for setting an electronic display device, e.g. for a vehicle, to a secure state. This can be a display device, such as that described in reference to the preceding Figures. The steps of the method can be executed using a device for setting the electronic display device to a secure state.

In a step 501, a diagnosis signal is received via an interface to a control mechanism for controlling the display device. In a step 502, a reset signal is output at an interface to the display device, this being dependent on a signal status of the diagnosis signal. As a result of receiving the reset signal by the display device, a current image datum depicted by the display device is replaced by a secure image datum.

The exemplary embodiments described herein and shown in the figures are selected only by way of example. Different exemplary embodiments can be combined with one another, either entirely, or with respect to individual features. Moreover, an exemplary embodiment can be supplemented by the features of another exemplary embodiment. Furthermore, method steps according to the invention may be repeated, as well as executed in a sequence differing from that described herein.

If an exemplary embodiment comprises an "and/or" conjunction between a first feature and a second feature, then this can be read to mean that the exemplary embodiment has both the first feature as well as the second feature according to one embodiment, and has either only the first feature or only the second feature according to another embodiment.

REFERENCE SYMBOLS 100 vehicle
102 transmission
104 gearshift lever
106 display device
110 control device
112 control mechanism
114 device
116 battery
118 sensor
120 image signal
122 reset signal
124 diagnosis signal
142 monitoring mechanism
231 display screen
232 logic mechanism
240 operating voltage
244 energy reserve
246 switch
248 integrated circuit
250 receiving mechanism
252 output device
360 reset signal
501 reception step
502 output step

What is claimed is:

1. A method for setting an electronic display device for a vehicle to a secure state, wherein the electronic display device is designed to display, in response to an image signal received from a control mechanism, an image datum transmitted by the image signal and to maintain the display without applying an operating voltage, the method comprising:
  receiving a datum via an input interface of the control mechanism, wherein the datum represents a gear setting of a transmission of the vehicle that has been, or is to be, shifted to;
  outputting the image signal via the control mechanism with the image datum representing the gear setting;
  receiving a diagnosis signal via an interface of a receiving mechanism from the control mechanism, wherein the diagnosis signal represents a signal provided by the control mechanism; and
  outputting of a reset signal from an interface of an output device to the display device, depending on a signal status of the diagnosis signal, wherein the reset signal is designed to trigger a display of a secure image datum by the display device to set the display device to the secure state.

2. The method of claim 1, wherein the outputting of a reset signal comprises the reset signal being output when the diagnosis signal exhibits an inactive status.

3. The method of claim 1, wherein the method further comprises controlling an energy flow of an energy necessary for outputting the reset signal, using the diagnosis signal, and the reset signal is output in the outputting of a reset signal using the energy.

4. The method of claim 3, wherein the method further comprises accumulating an energy reserve for providing the energy flow.

5. A device for setting an electronic display device for a vehicle to a secure state, wherein the electronic display device is designed to display, in response to an image signal received by a control mechanism, an image datum transmitted by the image signal, and to maintain the display without applying an operating voltage, and wherein the control mechanism comprises an input interface for receiving a datum regarding a gear setting of a transmission of the vehicle that has been, or is to be, shifted to, and the control mechanism is designed to output the image signal with the image datum representing the gear setting, the setting device comprising:
- a receiving mechanism for receiving a diagnosis signal via an interface of the receiving mechanism from the control mechanism; wherein the diagnosis signal represents a signal provided by the control mechanism; and
- an output device for outputting a reset signal via an interface of the output device to the display device, depending on a signal status of the diagnosis signal, wherein the reset signal is designed to trigger a display of a secure image datum by the display device, in order to set the display device to the secure state.

6. The device of claim 5, wherein the device further comprises a switching mechanism and a provision mechanism for providing the reset signal to the output device, wherein the switching mechanism is designed to control a connection, controlled by the diagnosis signal between the provision mechanism and an interface to an energy reserve to provide an energy necessary for operating the provision mechanism.

7. The device of claim 6, wherein the device exhibits the energy reserve in the form of a capacitor or a rechargeable battery.

8. The device of claim 6, wherein the device is designed to output a part of the energy to an operating voltage interface in order to provide the operating voltage for the display device.

9. A control device for controlling an electronic display device for a vehicle, wherein the electronic display device is designed to display, in response to an image signal received by a control mechanism, an image datum transmitted by the image signal and to maintain the display without applying an operating voltage, the control device comprising:
- the control mechanism comprising a first output interface for providing the image signal, and a second output interface for outputting a diagnosis signal, wherein the control mechanism is designed to trigger an active signal status of the diagnosis signal when the control mechanism is in a secure operating mode, and to trigger or maintain an inactive signal status of the diagnosis signal when the control mechanism is in a non-secure operating mode, or an inactive mode; wherein the control mechanism also comprises an input interface for receiving a datum regarding a gear setting of a transmission of the vehicle that has been, or is to be, shifted to, and the control mechanism is designed to output the image signal via the first output interface with the image datum representing the gear setting; and
- a setting device for setting the electronic display device to a secure state, wherein the setting device is designed to output a reset signal when the diagnosis signal exhibits the inactive signal status, and to not output the reset signal when the diagnosis signal exhibits the active signal status; the setting device comprising:
  - a receiving mechanism for receiving the diagnosis signal via an interface of the receiving mechanism from the control mechanism; wherein the diagnosis signal represents a signal provided by the control mechanism; and
  - an output device for outputting the reset signal from an interface of the output device to the display device, depending on a signal status of the diagnosis signal, wherein the reset signal is designed to trigger a display of a secure image datum by the display device, in order to set the display device to the secure state.

10. The control device of claim 9, wherein the control mechanism is designed to output the image signal via the first output interface with the image datum representing a directional indicator for reaching the gear setting that is to be shifted to.

11. The control device of claim 9, wherein the input interface of the control mechanism is configured to receive a datum regarding an error in the control device, and the control mechanism is designed to output the image signal via the first output interface with the image datum representing the error.

12. The method of claim 2, wherein the method further comprises controlling an energy flow of an energy necessary for outputting the reset signal, using the diagnosis signal, and the reset signal is output in the outputting of a reset signal using the energy.

13. The device of claim 7, wherein the device is designed to output a part of the energy to an operating voltage interface in order to provide the operating voltage for the display device.

14. The control device of claim 9, wherein the setting device further comprises a switching mechanism and a provision mechanism for providing the reset signal to the output device, wherein the switching mechanism is designed to control a connection, controlled by the diagnosis signal between the provision mechanism and an interface to an energy reserve to provide an energy necessary for operating the provision mechanism.

15. The control device of claim 14, wherein the setting device exhibits the energy reserve in the form of a capacitor or a rechargeable battery.

16. The control device of claim 9, wherein the setting device is designed to output a part of the energy to an operating voltage interface in order to provide the operating voltage for the display device.

17. The control device of claim 10, wherein the input interface of the control mechanism is configured to receive a datum regarding an error in the control device, and the control mechanism is designed to output the image signal via the first output interface with the image datum representing the error.

* * * * *